US010362306B2

(12) United States Patent
Shibayama et al.

(10) Patent No.: US 10,362,306 B2
(45) Date of Patent: Jul. 23, 2019

(54) IMAGE COMMUNICATION APPARATUS, IMAGE TRANSMISSION APPARATUS, AND IMAGE RECEPTION APPARATUS

(71) Applicant: RENESAS ELECTRONICS CORPORATION, Tokyo (JP)

(72) Inventors: Tetsuya Shibayama, Tokyo (JP); Seiji Mochizuki, Tokyo (JP); Katsushige Matsubara, Tokyo (JP); Kenichi Iwata, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 271 days.

(21) Appl. No.: 14/830,606

(22) Filed: Aug. 19, 2015

(65) Prior Publication Data
US 2016/0057432 A1 Feb. 25, 2016

(30) Foreign Application Priority Data

Aug. 25, 2014 (JP) ................. 2014-170404

(51) Int. Cl.
*H04B 1/66* (2006.01)
*H04N 19/124* (2014.01)
(Continued)

(52) U.S. Cl.
CPC ......... *H04N 19/124* (2014.11); *G06K 9/4614* (2013.01); *G06K 9/6257* (2013.01);
(Continued)

(58) Field of Classification Search
CPC .... H04N 19/176; H04N 19/107; H04N 19/61; H04N 19/124; H04N 19/59
(Continued)

(56) References Cited

U.S. PATENT DOCUMENTS 8,625,924 B2 1/2014 Tanaka et al.
2008/0123749 A1 5/2008 Bretillon et al.
(Continued)

FOREIGN PATENT DOCUMENTS

JP 2001-331892 A 11/2001
JP 2008-022404 A 1/2008
(Continued)

OTHER PUBLICATIONS

Extended European Search Report dated Jan. 26, 2016.
(Continued)

*Primary Examiner* — Jamie J Atala
*Assistant Examiner* — Masum Billah
(74) *Attorney, Agent, or Firm* — McGinn I. P. Law Group, PLLC.

(57) ABSTRACT

Included are an encoding section, a decoding section, and an image recognition section. The encoding section performs an encoding process for a video signal to be input based on a calculated encoding mode, and transmits an encoded stream. The decoding section performs a decoding process for the received encoded stream, and outputs a decoded image. The image recognition section performs an image recognition process for the decoded image. The encoding section adjusts the encoding mode based on recognition accuracy information representing the certainty of a recognition result in the image recognition section.

20 Claims, 4 Drawing Sheets

(51) Int. Cl.
*H04N 19/117* (2014.01)
*H04N 19/103* (2014.01)
*H04N 19/46* (2014.01)
*H04N 19/115* (2014.01)
*H04N 19/136* (2014.01)
*H04N 19/54* (2014.01)
*G06K 9/46* (2006.01)
*G06K 9/62* (2006.01)
*H04N 19/61* (2014.01)
*H04N 19/154* (2014.01)

(52) U.S. Cl.
CPC ......... *H04N 19/103* (2014.11); *H04N 19/115* (2014.11); *H04N 19/117* (2014.11); *H04N 19/136* (2014.11); *H04N 19/46* (2014.11); *H04N 19/54* (2014.11); *H04N 19/154* (2014.11); *H04N 19/61* (2014.11)

(58) Field of Classification Search
USPC .......................................................... 375/240
See application file for complete search history.

(56) References Cited

U.S. PATENT DOCUMENTS

| | | | | |
|---|---|---|---|---|
| 2010/0303296 | A1* | 12/2010 | Hattori | H04N 19/15 382/103 |
| 2013/0287251 | A1* | 10/2013 | Mitsui | G06K 9/6267 382/103 |
| 2014/0161416 | A1* | 6/2014 | Chou | H04N 5/91 386/241 |
| 2015/0271497 | A1* | 9/2015 | Unno | H04N 19/176 382/251 |

FOREIGN PATENT DOCUMENTS

| | | |
|---|---|---|
| JP | 2008-524893 A | 7/2008 |
| JP | 2011-234033 A | 11/2011 |
| JP | 2013-239995 A | 11/2013 |
| JP | 2013239995 A * | 11/2013 |
| WO | WO 2011/135776 A1 | 11/2011 |

OTHER PUBLICATIONS

Japanese Office Action, dated Feb. 20, 2018, in Japanese Application No. 2014-170404 and English Translation thereof.
Communication pursuant to article 94(3) EPC dated Jul. 25, 2018 in European Application No. 15 181 515.6.

* cited by examiner

IMAGE COMMUNICATION APPARATUS, IMAGE TRANSMISSION APPARATUS, AND IMAGE RECEPTION APPARATUS

CROSS-REFERENCE TO RELATED APPLICATIONS

The disclosure of Japanese Patent Application No. 2014-170404 filed on Aug. 25, 2014 including the specification, drawings and abstract is incorporated herein by reference in its entirety.

TECHNICAL FIELD

The present invention relates to an image communication apparatus, an image transmission apparatus, and an image reception apparatus, particularly applicable preferably to an image encoding transmission/reception device involving image recognition.

BACKGROUND

A system for transmitting and displaying image information, such as an original image, imaged by a camera, once encodes/compresses the original image, and transmits it. After this, the system displays an image (decoded image) which has been obtained by decoding the image. Because the image information generally includes a large quantity of information, it is necessary to limit a transmission bandwidth in a transmission as a network. In this image transmission system, image recognition may sometimes be required, instead of or in addition to the displaying. For example, a monitoring camera finds any suspicious persons, while an onboard camera obtains the space between vehicles recognizes traffic signs, or performs image recognition in order to avoid collision with pedestrians, other vehicles, and any other obstructions.

Japanese Unexamined Patent Application Publication No. 2008-22404 discloses an image encoding apparatus. This apparatus includes a feature amount extracting section on the front stage of image recognition, obtains a flatness level (activity) of an image using a feature amount calculating section, and improves the image quality by determining parameters regarding the deblocking filter included in an image encoding process.

Japanese Unexamined Patent Application Publication No. 2013-239995 discloses a method for realizing a high recognition rate in an onboard camera system for driving assistance for vehicles. In this system, a video transmission device encodes and transmits a video image, and image recognition is performed using a video image decoded by a video reception device. The video reception device transmits encoding control information (such as an image size of a moving image format, a color format, a frame rate, a bit depth) to an encoder control section of the video transmission device, in accordance with a traveling state of the vehicle and the driving assistance application (such as a lane deviation warning, collision prevention, or displaying of the rear moving image). The transmission side changes an encoding mode based on the encoding control information, and generates a moving image stream. For example, when a video signal is output to an external display device, a deblocking filter function is ON. On the contrary, the deblocking filter function is OFF, when it is used for an image recognition process. This prevents a decrease in the recognition rate, because edge information deteriorates (the paragraph "0048" of the same literature). In addition, the recognition rate can further be increased (the paragraph "0044" of the same literature). For this increase, a noticed area is determined through rough search as preprocessing of the image recognition process, this information is transmitted to the side of an encoding unit, and a quantization step width of the noticed area is controlled to be small by an encoding process of the encoding unit side.

SUMMARY

As a result of consideration by the present inventors on the above Japanese Unexamined Patent Application Publications, new problems have been found, as will be described below.

General image encoding techniques include an encoding technique for generating an image with less noise as visibly recognized by human eyes and an encoding technique for determining an encoding mode for minimizing the number of bits to be generated. When to perform image recognition for its decoded image, it may not necessarily be applicable to an image recognition process. Therefore, it is understood that the recognition rate cannot sufficiently be improved, for the decoded image which has been compressed/expanded in accordance with a general image encoding technique.

The image encoding technique disclosed in Japanese Unexamined Patent Application Publication No. 2008-22404 is a method for determining parameters for the deblocking filter, in a manner to improve the image quality of the decoded image, when recognized by the human eyes. Thus, it cannot be said that the same parameter is suitable for improving the recognition rate of the image recognition.

In the onboard camera system disclosed in Japanese Unexamined Patent Application Publication No. 2013-239995, the video reception device which performs image recognition transmits the encoding control information to the encoder control unit of the video transmission device, in accordance with the traveling state of the vehicle and the driving assistance application (late deviation warning, collision prevention, and displaying of the rear moving image). Thus, corresponding encoding control information needs clearly be defined, in association with each traveling state of the vehicle and each driving assistance application. For example, the noticed area of the image recognition needs to be defined in advance, in association with each traveling state of the vehicle and each driving assistance application. When this cannot be defined in advance, the rough search needs to additionally be performed as preprocessing of the image recognition process (the paragraph "0044" of the same literature).

However, an optimum value of the encoding mode for improving the recognition rate of the image recognition may not uniquely be defined in accordance with the traveling state of the vehicle and the driving assistance application. In general, it is changed in real time depending on the condition at the time the image recognition process is executed, like the above-described noticed area.

Therefore, in the onboard camera system disclosed in Japanese Unexamined Patent Application Publication No. 2013-239995, the encoding control information defined in accordance with the traveling state of the vehicle and the driving assistance application may not always be the optimum encoding control information for the image recognition process. An understood problem is that the recognition rate decreases.

An encoding process is executed for the video signal, and the signal is transmitted and decoded. In image communication in which the image recognition process is executed for this decoded image, the video signal to be transmitted may be changed in real time. It is understood that, even in this case, it is necessary to supply a value of the encoding mode which is suitable for the image recognition process in accordance with the change for the encoding process, without decreasing the image recognition rate.

Descriptions will now be made to a system for solving the problems. Any other problems and new features will be obvious from the descriptions of the present specification and the attached drawings.

The following is a description of one embodiment.

Included are an encoding section, a decoding section, and an image recognition section. The encoding section performs an encoding process for an input video signal based on a calculated encoding mode, and transmits an encoded stream. The decoding section performs a decoding process for the received encoded stream, and outputs a decoded image. The image recognition section performs an image recognition process for the decoded image. The encoding section adjusts the encoding mode, based on recognition accuracy information representing certainty of a result of recognition by the image recognition section.

The effect according to the one embodiment will briefly be described as follows.

That is, it is possible to perform an encoding process using an appropriate encoding mode, in conformity with a change of the video signal in real time, and to maintain a high image recognition rate.

DESCRIPTION OF THE PREFERRED EMBODIMENTS

Figure 1:
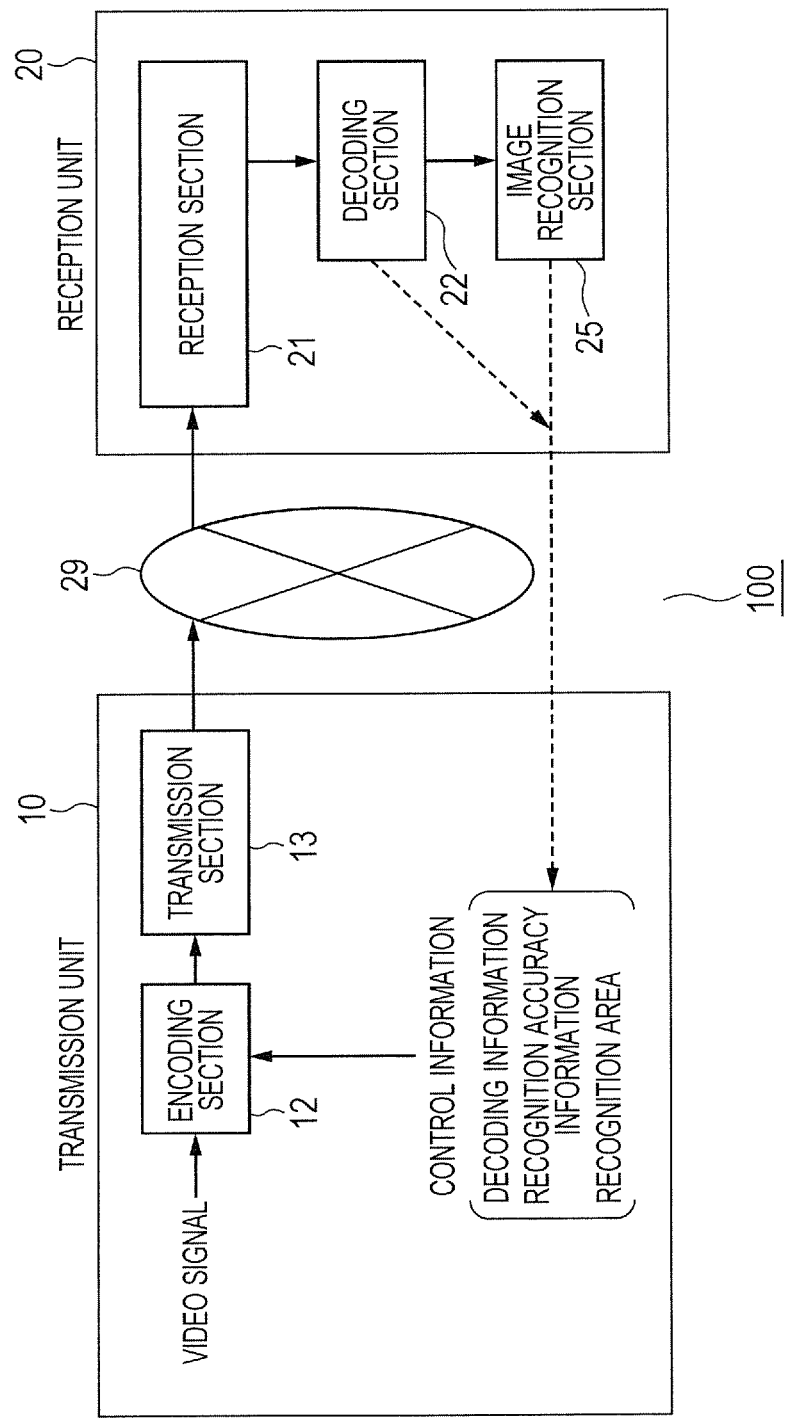
FIG. 1 is a block diagram illustrating a configuration example of an image communication apparatus according to an embodiment 1.

1. Descriptions will now schematically be made to preferred embodiments disclosed in the present application, firstly, a representative embodiment. In the schematic descriptions for the representative embodiment, those reference numerals of the drawings that are referred in brackets simply exemplify those included in the ideas of the constituent elements with the attached numerals.

[1] <Optimization of Encoding Mode Based on Image Recognition Accuracy Information>

An image communication apparatus (100) according to the representative embodiment disclosed in the present invention includes an encoding section (12), a decoding section (22), and an image recognition section (25). The section (12) performs an encoding process for a video signal to be input based on a calculated encoding mode, and generates an encoded stream. The section (22) performs a decoding process for the received encoded stream, and outputs a decoded image. The image recognition section (25) performs an image recognition process for the decoded image. The encoding section adjusts the encoding mode, based on recognition accuracy information representing the certainty of a recognition result of the image recognition section.

As a result, it is possible to perform an encoding process using an appropriate encoding mode, in conformity with a change of the video signal in real time, and to maintain a high image recognition rate.

[2] <Transmit Recognition Accuracy Information from Parameter Transmission Section of Reception Section>

The image communication apparatus includes an image transmission apparatus (transmission unit) (10) and an image reception apparatus (reception unit) (20).

The image reception apparatus includes the decoding section, the image recognition section, and a parameter transmission section (26) which transmits control information including the recognition accuracy information generated by the image recognition section.

The image transmission apparatus includes the encoding section, and a reception section (14) which receives the control information, and supplies the recognition accuracy information included in the control information to the encoding section.

As a result, the image reception apparatus (reception unit) transmits the recognition accuracy information representing the certainty of the recognition result in the image recognition section, thus reducing the processing load. The side of the image transmission apparatus (transmission unit) refers to parameters held by itself in addition to the received recognition accuracy information, calculates or selects an appropriate encoding mode, thus enabling to execute the encoding process.

[3] <Transmit Encoding Mode from Parameter Transmission Section of Reception Unit>

The image communication apparatus includes an image transmission apparatus (10) and an image reception apparatus (20).

The image reception apparatus includes the decoding section, the image recognition section, and a parameter transmission section (26) which transmits control information including the encoding mode adjusted based on the recognition accuracy information generated by the image recognition section.

The image transmission apparatus includes the encoding section and a reception section which receives the control information and supplies the encoding mode included in the control information to the encoding section.

As a result, the side of the image reception apparatus (reception unit) calculates or selects an appropriate encoding mode, and transmits it to the image transmission apparatus (transmission unit) side, thereby simplifying the image transmission apparatus (transmission unit).

[4] <Use Received Control Information by Imaging Signal Processing Section>

The image transmission apparatus further includes an imaging signal processing section (11) which generates the video signal from an imaging signal to be input.

The encoding mode includes parameters for a signal process to be executed for the imaging signal processing section to generate the video signal, and the parameters included in the control information received by the reception section are supplied to the imaging signal processing section.

As a result, the video signal input to the encoding section is optimized before the encoding process, and it is possible to maintain a high recognition rate of the image recognition process on the side of the image reception apparatus (reception unit).

[5] <Extract Recognition Accuracy Information by Image Recognition Section Built in Transmission Unit>

The image communication apparatus includes an image transmission apparatus (10) and an image reception apparatus (20). The image recognition section is used as a reception-side image recognition section (25). The image reception apparatus includes the decoding section and the reception-side image recognition section.

The image transmission apparatus includes an imaging signal processing section (11) which generates the video signal from an imaging signal to be input, a transmission-side image recognition section (15), and the encoding section.

The transmission-side image recognition section performs an image recognition process for the video signal processed by the imaging signal processing section, and supplies the encoding section with the certainty of a recognition result in the transmission-side image recognition section, as recognition accuracy information representing the certainty of the recognition result in the reception-side image recognition section. The encoding section adjusts the encoding mode based on the recognition accuracy information.

As a result, the image transmission apparatus (transmission unit) can estimate and use the recognition accuracy information representing the certainty of the recognition result in the reception-side image recognition section on the side of the image recognition section (reception unit). Thus, an optimum encoding mode can quickly be calculated or selected, thus enabling to execute the encoding process.

[6] <Image for Recognition/Marker for Recognition>

The image transmission apparatus is configured (34, 35) to include an image for evaluation given in advance, as the video signal.

The encoding section performs an encoding process for the video signal including the image for evaluation. The image recognition section in the image reception apparatus performs an image recognition process for a decoded image corresponding to the image for evaluation, to obtain recognition accuracy information. The image transmission apparatus or the image reception apparatus adjusts the encoding mode in a manner that the obtained recognition accuracy information is equal to expected recognition accuracy information.

As a result, the optimum value of the encoding mode can accurately be obtained.

[7] <Image Transmission Apparatus>

An image transmission apparatus (10) according to a representative embodiment disclosed in the present application includes an encoding section (12) and a transmission section (13). The encoding section performs an encoding process for a video signal to be input based on a calculated encoding mode. The transmission section transmits an encoded stream to an image reception apparatus.

The image reception apparatus includes an image recognition section (25) performing a decoding process for a received encoded stream and performing an image recognition process for a generated decoded image.

The encoding section adjusts the encoding mode, based on recognition accuracy information representing the certainty of a recognition result in the image recognition section of the image reception apparatus.

As a result, it is possible to provide an image transmission apparatus, which performs the encoding process using an appropriate encoding mode, in conformity with a change in the video signal in real time, and to maintain a high image recognition rate.

[8] <Receive Recognition Accuracy Information from Parameter Transmission Section of Reception Unit>

The image reception apparatus is configured (26) to transmit control information including the recognition accuracy information generated by the image recognition section.

The image transmission apparatus further includes a reception section (14) receiving the control information and supplying the recognition accuracy information included in the control information to the encoding section. The encoding section adjusts the encoding mode based on the recognition accuracy information supplied from the reception section, and executes the encoding process based on the adjusted encoding mode.

As a result, the processing load on the side of the image reception apparatus (reception unit) is reduced. The image transmission apparatus (transmission unit) side refers to parameters held by itself in addition to the received recognition accuracy information, and calculates or selects an appropriate encoding mode, thereby executing the encoding process.

[9] <Receive Encoding Mode from Parameter Transmission Section of Reception Unit>

The image reception apparatus is configured (26) to transmit control information including the encoding mode adjusted based on the recognition accuracy information generated by the image recognition section.

The image transmission apparatus further includes a reception section (14) receiving the control information and supplying the encoding mode included in the control information to the encoding section. The encoding section executes the encoding process based on the encoding mode supplied from the reception section.

As a result, the side of the image reception apparatus (reception unit) calculates or selects an appropriate encoding mode, and transmits it to the side of the image transmission apparatus (transmission unit), thereby simplifying the image transmission apparatus (transmission unit).

[10] <Use Received Control Information in Imaging Signal Processing Section>

The image transmission apparatus further includes an imaging signal processing section (11) which generates the video signal from an imaging signal to be input.

The control information includes parameters for a signal process to be executed for the imaging signal processing section to generate the video signal. The parameters included in the control information received by the reception section are supplied to the imaging signal processing section.

As a result, the video signal to be input to the encoding section is optimized before the encoding process, and it is possible to maintain a high recognition rate of the image recognition section on the side of the image reception apparatus (reception unit).

[11] <Extract Recognition Accuracy Information in Image Recognition Section Built in Transmission Unit>

The image recognition section is used as a reception-side image recognition section, and the image reception apparatus includes the decoding section and the reception-side image recognition section.

The image transmission apparatus includes an imaging signal processing section (11) generating the video signal from an imaging signal to be input, a transmission-side image recognition section (15), and the encoding section.

The transmission-side image recognition section performs an image recognition process for the video signal processed by the imaging signal processing section, and supplies the encoding section with the certainty of a recognition result in the transmission-side image recognition section as recognition accuracy information representing the certainty of the recognition result in the reception-side image recognition section. The encoding section adjusts the encoding mode based on the recognition accuracy information.

As a result, the image transmission apparatus (transmission unit) can estimate and use recognition accuracy information representing the certainty of the recognition result in the reception-side image recognition section on the side of the image reception apparatus (reception unit). Thus, it is possible to quickly calculate or select an encoding mode, thus enabling to execute the encoding process.

[12] <Image for Recognition/Marker for Recognition>

The image transmission apparatus is configured (34, 35) to include an image for evaluation given in advance, as the video signal.

The encoding section performs an encoding process for the video signal including the image for evaluation. The image recognition section in the image reception apparatus performs an image recognition process for a decoded image corresponding to the image for evaluation, to obtain recognition accuracy information. The image transmission apparatus or the image reception apparatus adjusts the encoding mode in a manner that the obtained recognition accuracy information is equal to expected recognition accuracy information.

As a result, it is possible to accurately obtain the optimum value of the encoding mode.

[13] <Switch to Image for Recognition>

The image transmission apparatus further includes a selector (34) which selects which of the video signal and the image for evaluation is supplied to the encoding section.

As a result, it is possible to accurately obtain the optimum value of the encoding mode, using an image for evaluation instead of the video signal to be input.

[14] <Insert Marker for Recognition>

The image transmission apparatus further includes a marker insertion section (35) for recognition which can insert the image for evaluation into the video signal.

As a result, it is possible to accurately obtain the optimum value of the encoding mode, using the marker image for evaluation inserted into the video signal to be input.

[15] <Image Reception Apparatus>

An image reception apparatus (20) according to a representative embodiment disclosed in the present application includes a reception section (21), a decoding section (22), an image recognition section (25), and a parameter transmission section (26). The reception section receives an encoded stream transmitted from an image transmission apparatus (10). The decoding section performs a decoding process for the encoded stream received by the reception section, and outputs a decoded image. The image recognition section performs an image recognition process for the decoded image.

The encoded stream is generated through an encoding process using an encoding mode for a video signal, in the image transmission apparatus.

The parameter transmission section transmits control information for adjusting the encoding mode in the image transmission apparatus, based on recognition accuracy information representing the certainty of a recognition result in the image recognition section.

As a result, it is possible to provide an image reception apparatus which performs an encoding process using an appropriate encoding mode in conformity with a change in the video signal in real time, and to maintain a high image recognition rate.

[16] <Transmit Recognition Accuracy Information from Parameter Transmission section of Reception Unit>

The parameter transmission section transmits the recognition accuracy information as the control information for adjusting the encoding mode in the image transmission apparatus. The image transmission apparatus adjusts the encoding mode based on the received recognition accuracy information.

As a result, the side of the image reception apparatus (reception unit) transmits the recognition accuracy information representing the certainty of the recognition result in the image recognition section, as is, thus reducing the processing load. On the other hand, the side of the image transmission apparatus (transmission unit) refers to the parameters held by itself in addition to the received recognition accuracy information, calculates or selects an appropriate encoding mode, thereby enabling to execute the encoding process.

[17] <Transmit Encoding Mode from Parameter Transmission Section of Reception Unit>

The parameter transmission section transmits the encoding mode adjusted based on the recognition accuracy information generated by the image recognition section, as the control information. The image transmission apparatus executes the encoding process using the encoding mode received as the control information.

As a result, the side of the image reception apparatus (reception unit) calculates or selects an optimum encoding mode, and transmits it to the side of the image transmission apparatus (transmission unit), thereby simplifying the image transmission apparatus (transmission unit).

[18] <Transmit Decoded Information from Parameter Transmission Section>

In the image reception apparatus, the control information transmitted by the parameter transmission section includes decoded information obtained through the decoding process in the decoding section or information generated based on the decoded information.

As a result, the encoding mode is appropriately optimized.

2. Specific Description of Preferred Embodiments

Descriptions will now specifically be made to the preferred embodiments.

Embodiment 1

<Basic Configuration (Optimization of Encoding Mode Based on Recognition Accuracy Information)>

FIG. 1 is a block diagram illustrating a configuration example of an image communication apparatus 100 according to an embodiment 1.

The image communication apparatus 100 is configured to include a transmission unit 10 and a reception unit 20 which are mutually coupled through a communication path 29, such as a network. The transmission unit 10 includes an encoding section 12 and a transmission section 13. The encoding section 12 encodes a video signal based on the obtained encoding mode to generate an encoded stream. The transmission section 13 transmits the generated encoded stream over a predetermined protocol to the communication path 29. The reception unit 20 includes a reception section 21, a decoding section 22, and an image recognition section 25. The reception section 21 reproduces an encoded stream from a signal (packet) received from the communication path 29. The decoding section 22 decodes the received encoded stream to generate a decoded image. The image recognition section 25 executes an image recognition process for the decoded image. In this case, the word "obtained" implies a process of the encoding section 12 for selecting an appropriate encoding mode based on encoding efficiency, and the process may be externally specified.

The encoding section 12 in the transmission unit 10 adjusts the encoding mode for use in encoding the above-described video signal, based on the recognition accuracy information representing the certainty of a recognition result in the image recognition section 25 of the reception unit 20. That is, the encoding mode is changed in a way to improve the certainty of the recognition result, such as the image recognition rate.

As a result, it is possible to perform an appropriate encoding mode, in conformity with a change of the video signal in real time, and to maintain a high image recognition rate.

Figure 2:
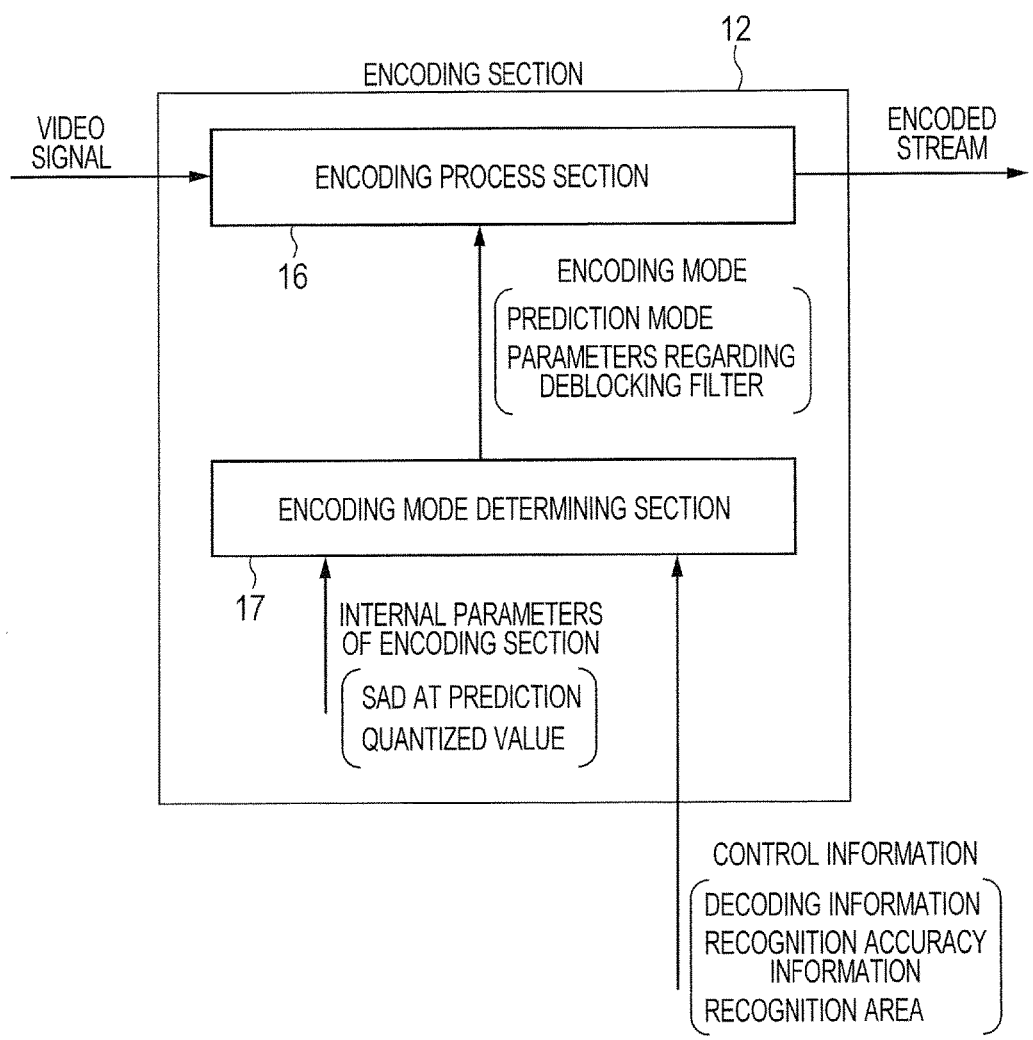
FIG. 2 is a block diagram illustrating a configuration example of an encoding section.

FIG. 2 is a block diagram illustrating a configuration example of the encoding section 12 in the transmission unit 10. The encoding section 12 includes an encoding process section 16 and an encoding mode determining section 17. The section 16 receives an input video signal, and outputs an encoded stream. The section 17 gives an encoding mode to the encoding process section 16. The encoding mode includes parameters regarding a prediction mode and a deblocking filter. The encoding mode determining section 17 changes the encoding mode in a way to improve the certainty of the recognition result, based on the recognition accuracy information representing the certainty of the recognition result in the image recognition section 25 of the reception unit 20 and included in input control information. The section 17 supplies the changed encoding mode to the encoding process section 16. At this time, the encoding section 12 includes decoding information or recognition area information, in addition to the recognition accuracy information. In addition to this, the encoding mode determining section 17 refers to internal parameters of the encoding section 12, obtains an optimum encoding mode, and supplies the obtained mode to the encoding process section 16. The internal parameters of the encoding section 12 include, for example, a SAD (Sum of Absolute Difference: sum of the absolute value of an error between an input signal and a prediction signal) and a quantized value at the prediction.

In this case, the optimum encoding mode does not imply a parameter value that can necessarily maximize the image recognition rate. For example, in the reception unit 20, when the decoded image is used not only for image recognition, but also for display, an appropriate parameter is the most suitable under the consideration of visibility (the view perceived by human eyes).

The recognition accuracy information representing the certainty of the recognition result includes, for example, recognition accuracy information representing the certainty of results of image detection, recognition, and tracking by the image recognition section 25. The information also includes information representing the recognition area and recognition area information. The certainty of results of recognition and detection can be acquired from a threshold value representing a similarity level of processes or the number of passing stages of identification circuits. Several methods may be given as methods for acquiring the certainty of results of recognition and detection, using a recognition/detection algorithm or application. Some examples are provided below.

For the object detection for face or sign, the main method is a technique for combining a local feature amount and a statistical learning technique. For example, for face detection, a face detection circuit is configured in combination of a plurality of Haar-like feature amounts. In the detection circuit, weak identification circuits are coupled in cascade, and an optimum feature amount for identification is selected from a plurality of local feature amounts using the AdaBoost. In this case, the number of passing stages of the weak identification circuits coupled in cascade can become an index of the certainty of the detection.

In a particular object recognition process, such as sign recognition, previous learning is possible. Thus, sign recognition is possible by performing corresponding point search, using feature amounts obtained from a reference image and an input image in advance. A threshold value process is performed on values representing similarity levels. Thus, the Euclidean distances to the threshold value becomes an index representing the similarity levels.

In the object tracking, the KLT (Kaneda Lucas Tomasi) technique is used for obtaining a movement destination based on an assumption that the movement of points in a local area is the same and an assumption that areas in a minute time are in a state of only a parallel movement. The feature points are determined using a similarity level (Euclidean distance) of feature amounts, such as SIFT (Scale Invariant Feature Transform) before or after the movement. Thus, the Euclidean distances of the feature amounts become the index.

Note that the recognition accuracy information representing the certainty of the recognition result in the image recognition section 25 of the reception unit 20 is not limited to information obtained by the image recognition section 25 of the reception unit 20. It is possible to provide, onto the transmission unit 10, means for acquiring or estimating the certainty of the recognition result in the image recognition section 25 of the reception unit 20. For example, a simple image recognition process is performed for a local decoded image generated by the encoding section 12 on the side of the transmission unit 10, or a recognition rate evaluation section is provided especially for the purpose of estimating the recognition rate. This enables to acquire or estimate the certainty of the recognition result in the image recognition section 25 of the reception unit 20, in the transmission unit 10. Some examples are provided below.

Embodiment 2

<Transmit Recognition Accuracy Information or Encoding Mode from Parameter Transmission Section>

Figure 3:
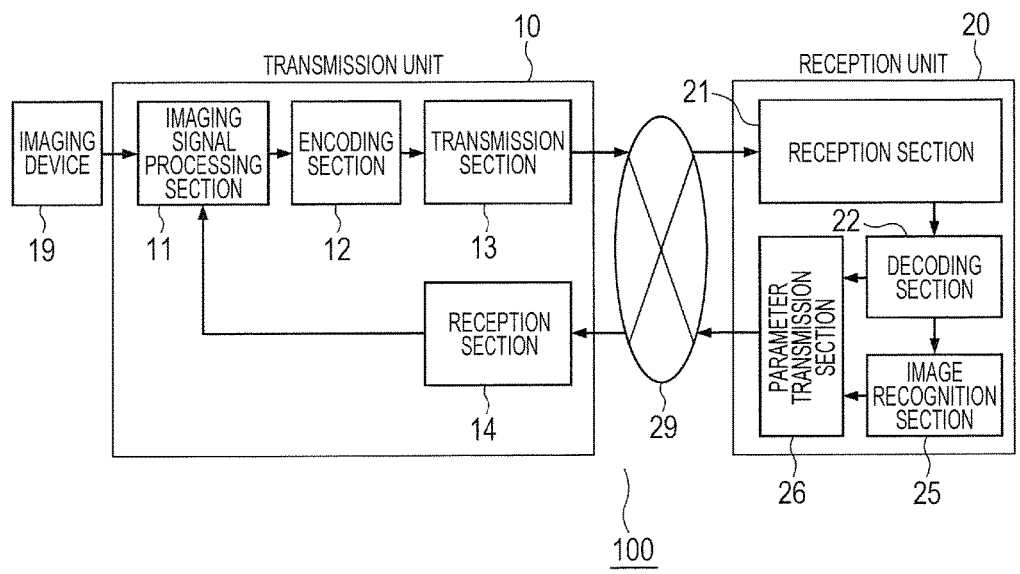
FIG. 3 is a block diagram illustrating a configuration example of an image communication apparatus according to an embodiment 2.

FIG. 3 is a block diagram illustrating a configuration example of an image communication apparatus 100 according to an embodiment 2.

The image communication apparatus 100 is configured to include a transmission unit 10 and a reception unit 20 which are mutually coupled through a communication path 29, such as a network.

The transmission unit 10 includes an imaging signal processing section 11, an encoding section 12, a transmission section 13, and a reception section. The section 11 processes an imaging signal input from a coupled imaging device 19. The section 12 encodes a video signal based on a calculated encoding mode to generate an encoded stream. The section 13 transmits the generated encoded stream a communication path 29 using a predetermined protocol. The reception unit 20 includes a reception section 21, a decoding section 22, an image recognition section 25, and a parameter transmission section 26. The section 21 reproduces an encoded stream from a signal received from the communication path 29. The section 22 decodes the received encoded stream to generate a decoded image. The section 25 executes an image recognition process for the decoded image.

The parameter transmission section 26 transmits, to the transmission section 10, control information for adjusting an encoding mode for use in encoding the above-described video signal, based on recognition accuracy information representing the certainty of a recognition result in the image recognition section 25. The reception section 14 of the transmission unit 10 receives the control information, and supplies it to the encoding section 12. The encoding section 12 changes the encoding mode in a way to improve the certainty of the recognition result, such as the image recognition rate, in the reception unit 20, based on the received control information.

The above-described control information (transmitted from the parameter transmission section 26 of the reception unit 20 to the reception section 14 of the transmission unit 10) may itself be the recognition accuracy information representing the certainty of the recognition result in the image recognition section 25, or may be the encoding mode which has been changed to a value optimized based on the recognition accuracy information. In the former case, the side of the reception unit 20 transmits the recognition accuracy information representing the certainty of the recognition result in the image recognition section, thus reducing the processing load. In addition, the side of the transmission unit 10 refers to parameters held by itself in addition to the received recognition accuracy information, to calculate or select an appropriate encoding mode, thus enabling to execute an encoding process. On the other hand, in the latter case, the side of the reception unit 20 calculates or selects an appropriate encoding mode, and transmits it to the side of the transmission unit 10, thereby simplifying the transmission unit 10.

Descriptions will now further specifically be made to the image communication apparatus 100 according to the embodiment 2 illustrated in FIG. 3.

The imaging device 19 may, for example, be a CCD (Charge Coupled Device), a CMOS (Complementally Metal Oxide Semiconductor) sensor or the like. An imaging process is performed for an imaging signal from the imaging device 19 by the imaging signal processing section 11 in the transmission unit 10, and the processed signal is transmitted to the encoding section 12 as a video signal. The encoding section 12 performs an image encoding process for image data of the input video signal, in accordance with an encoding standard, for example, H.264 or the like. As illustrated in FIG. 2, the encoding section 12 is separated to an encoding mode determining section 17 and an encoding process section 16. The encoding process section 16 performs encoding in conformity with the standard, in accordance with an encoding mode determined by the encoding mode determining section 17. The encoding mode determining section 17 determines an encoding mode using various parameters included in control information transmitted from the reception unit 20, as evaluation values, other than the SAD or quantized parameters (at the prediction) obtained in the encoding section 12 as in the past. The encoded stream is transmitted to the reception unit 20 by the transmission section 13 in the transmission unit 10. The encoded stream received by the reception section 21 inside the reception unit 20 is decoded by the decoding section 22. The image recognition section 25 in the reception unit 20 performs image recognition using the image decoded by the decoding section 22. As a result of image recognition, it transmits the image recognition rate or the recognition area information from the parameter transmission section 26 to the transmission unit 10 through the communication path 29.

It is preferred that the control information transmitted from the reception unit 20 to the transmission unit 10 include the decoded information obtained through the decoding process, the recognition accuracy information including the image recognition rate obtained by the image recognition section, and the image recognition area information. However, it is not limited to these information items, and the information may include any other information including data obtained in the reception unit 20. For example, possible information may be application information of the image recognition, information regarding a traveling state of vehicles, or information regarding the time, weather, or brightness of natural light. The decoded information is not limited to data obtained by the reception unit 20, and may be information that is obtainable by the encoding section 12 of the transmission unit 10. For example, when there is no need to perform a deblocking process like an intra encoder, the encoding section 12 inside the transmission unit 10 transmits decoding information (the parameter at the deblocking filter arithmetic operation) included in and with the control information, from the parameter transmission section 26 to the transmission unit 10. Note that this decoding information has been used at the time of decoding the decoded image by the decoding section 22 inside the reception unit 20. On the contrary, when the decoding section 12 inside the transmission unit 10 performs a deblocking process, there is no need to transmit the parameter at the deblocking filter arithmetic operation, because it can be obtained inside the transmission unit 10, and thus can be used.

As described above, when performing the image encoding based on H. 264, information from the decoding section (22) and the image recognition section (25) on the bidirectionally communicable communication path (29) is used. Hence, efficient encoding can possibly be performed as a system. That is, it is possible to accurately estimate a prediction mode or to determine a parameter value regarding the deblocking, at the time of encoding. Particularly, in a system which performs an image recognition process for a decoded image, it is possible to restrain lowering of the recognition rate.

Examples will more specifically be described.

As described in the embodiment 1, the image recognition section 25 extracts a feature amount using various techniques, and the feature points of the extracted feature amount are determined using a particular threshold value. That is, because image data near the threshold value is misjudged due to deterioration by the encoding, the recognition rate more decreases as compared with the case where a target is an uncompressed image. Thus, to improve the recognition rate, it is necessary to perform a process for switching to an encoding technique for maintaining the features, even by assigning many codes to a position in which the feature amounts exist around the threshold value, or by increasing the number of codes to be generated. For edge detection, some process is performed, for example, a process of assigning many codes to the macroblocks (including edges) or a process of transmitting information in an uncompressed form as is.

The encoding section 12 of this embodiment performs encoding in conformity with a standard specification. However, its characteristic is that the encoding technique can be changed in real time based on the control information supplied from the reception unit 20. For example, changeable encoding parameters include the following parameters (1) to (4) that can be applied in accordance with the importance level based on the recognition accuracy information supplied from the reception unit 20. As a result, the area specified by the image recognition section 26 can be encoded in a form approximating the original image, thus reducing the misjudgment due to deterioration by the encoding.

(1) Adjustment of the filter strength (weaken the filter strength or turn off the filter)
(2) Block division (Block division in small parts (Prediction mode))
(3) Bit assignment (Small quantized value)
(4) IPCM (Intra Pulse Code Modulation) encoding (uncompressing in the unit of 16*16)

In this embodiment 2, the reception unit 20 transmits the recognition accuracy information to the transmission unit 10, and the encoding mode is determined in the transmission unit 10. However, it is possible to determine an appropriate encoding mode inside the reception unit 10, and to directly specify the mode by itself.

Embodiment 3

<Extract Recognition Accuracy Information by Image Recognition Section Built in Transmission Unit>

Figure 4:
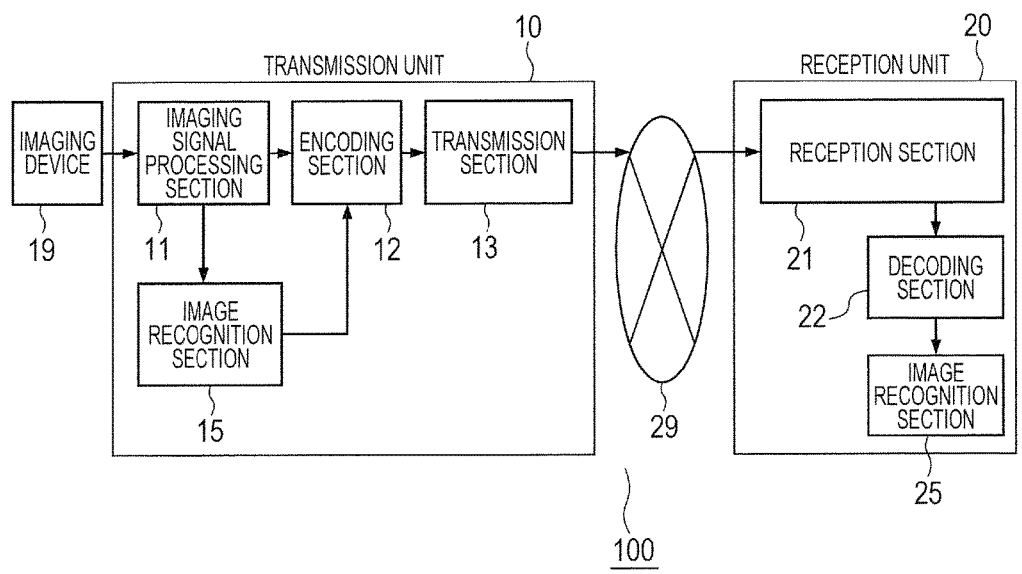
FIG. 4 is a block diagram illustrating a configuration example of an image communication apparatus according to an embodiment 3.

FIG. 4 is a block diagram illustrating a configuration example of an image communication apparatus according to an embodiment 3. Like the image communication apparatus according to the embodiment 2 illustrated in FIG. 3, an image communication apparatus 100 according to the embodiment 3 is configured to include a transmission unit 10 and a reception unit 20 which are mutually coupled through a communication path 29, such as network. Like the transmission unit of the embodiment 2, the transmission unit 10 includes an imaging signal processing section 11, an encoding section 12, a transmission section 13, and further an image recognition section 15, but excludes a reception section 14. The section 11 processes an imaging signal input from an imaging device 19. The section 12 encodes a video signal based on an encoding mode to generate an encoded stream. The section 13 transmits the generated encoded stream over a predetermined protocol to a communication path 29. Like the reception unit of the embodiment 2, the reception unit 20 includes a reception section 21, a decoding section 22, and an image recognition section 25, but excludes a parameter transmission section 26. The section 21 reproduces an encoded stream from a signal received from the communication path 29. The section 22 decodes the received encoded stream to generate a decoded image. The section 25 executes an image recognition process for the decoded image.

In the embodiment 2, adjustment (optimization) of the encoding mode for use in the encoding has been performed in a way to improve the certainty of the recognition result, such as the image recognition rate by the reception unit 20, based on a result of the image recognition process actually executed by the image recognition section of the reception unit 20. In the embodiment 3, instead of transmitting the control information from the reception unit 20, another image recognition section 15 is provided inside the transmission unit 10 to execute an image recognition process, thereby estimating recognition accuracy information representing the certainty of the recognition result in the image recognition section 25 of the reception unit 20. The encoding mode for use in encoding the transmission unit 10 is adjusted (optimized), based on the estimated recognition accuracy information or the like. As a result, an optimum encoding mode is more quickly calculated or selected, for execution of the encoding process. For example, in the embodiment 2, a delay of several frames occurs, because the control information is first fed back to the transmission unit 10, after the decoding by the reception unit 20 and execution of the image recognition process. However, in the embodiment 3, the encoding mode of a target frame can be adjusted, based on a result of image recognition regarding a video image of the target frame to be encoded, in the shortest time, thus enabling to minimize the delay.

In the configuration example illustrated in FIG. 4, the transmission-side image recognition section 15 is coupled to the imaging signal processing section 11. However, in place of this configuration, it may be coupled to the encoding section 12, for enabling to execute an image recognition process for a local decoded image.

Like the embodiment 2, the transmission unit 20 is configured to include the parameter transmission section 26, while the reception unit 10 is configured to include the reception section 14. Evaluation is made in combination of the recognition accuracy information representing the certainty of the recognition result in the transmission-side image recognition section 15 and the recognition accuracy information by the reception-side image recognition section 25 as transmitted from the reception unit 20. Further, the encoding mode for use in the encoding may be adjusted (optimized).

Embodiment 4

<Use Received Encoding Mode in Imaging Signal Processing Section>

Figure 5:
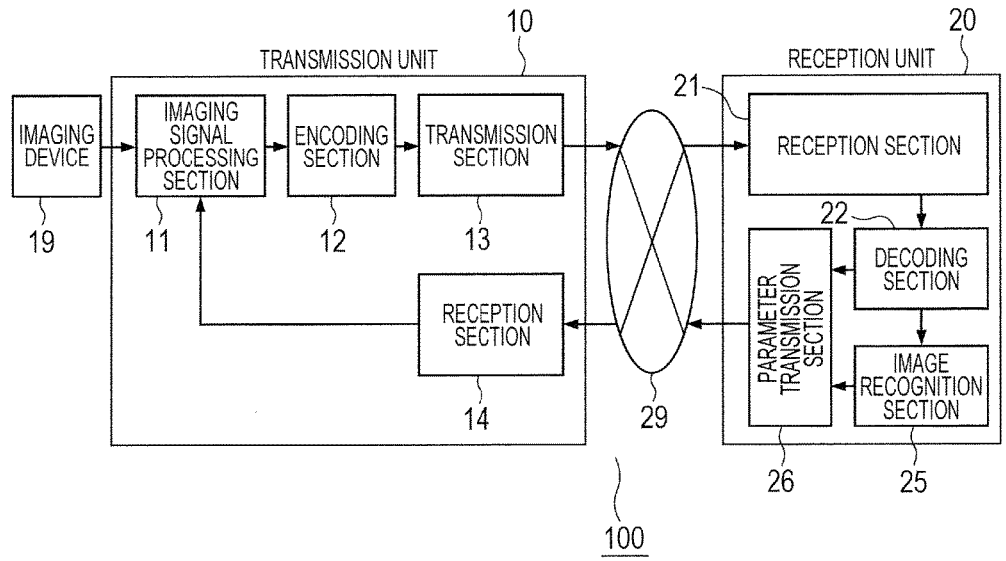
FIG. 5 is a block diagram illustrating a configuration example of an image communication apparatus according to an embodiment 4.

FIG. 5 is a block diagram illustrating a configuration example of an image communication apparatus according to an embodiment 4. Like the image communication apparatus according to the embodiment 2 illustrated in FIG. 3, an image communication apparatus 100 according to the embodiment 5 is configured to include a transmission unit 10 and a reception unit 20 which are mutually coupled through a communication path 29, such as a network. Like the reception unit of the embodiment 2, the reception unit 20 includes a reception section 21, a decoding section 22, an image recognition section 25, and a parameter transmission section 26. The section 21 reproduces an encoded stream from a signal received from the communication path 29. The section 22 decodes the received encoded stream to generate a decoded image. The section 25 executes an image recognition process for the decoded image. Like the transmission unit of the embodiment 2, the transmission unit 10 includes an imaging signal processing section 11, an encoding section 12, a transmission section 13, and a reception section 14. The section 11 processes an imaging signal input from an imaging device 19. The section 12 encodes a video signal to generate an encoded stream. The section 13 transmits the generated encoded stream over a predetermined protocol to a communication path 29. Control information received by the reception section 14 is supplied to the imaging signal processing section 11.

The imaging signal processing section 11 performs various processes for the input imaging signal. For example, various processes include gain adjustment, backlight correction, image level adjustment, gamma correction, color correction, and a filter process. For these correction and process, in general, those parameters that are regarded as optimum parameters are set by the application. In this embodiment, because it is possible to acquire control information from the reception unit 20 by the transmission unit 10. Thus, an image recognition rate or a recognition result can be fed back to a signal process of the imaging signal processing section 11, thus enabling to generate a video signal suitable for image recognition.

For example, when to recognize a traffic sign, color information may be used by application or algorithm of the image recognition section 25 in the reception unit 20. In this case, it is possible to improve the recognition rate, while using control information from the reception unit 20 and adjusting the color correction in the imaging signal processing section 11. When a filtering process (such as low pass filter) is performed inside the imaging signal process section, the strength/weakness and ON/OFF of the filter are controlled to be switched therebetween, and the strength/weakness and ON/OFF of particularly the surrounding of the recognition area are controlled to be switched.

Accordingly, it is possible to use the image recognition rate, the recognition area, or decoding information (which cannot be acquired originally by the transmission unit 10) in an optimization process of a signal process inside the imaging signal processing section 11. Therefore, in the image generation by the imaging signal processing section 11, it is possible to generate an image suitable for image recognition and to improve the image recognition rate by the reception unit 20.

In the configuration example illustrated in FIG. 5, the control information is not supplied from the reception section 14 to the encoding section 12. However, like the embodiment 2, it may be configured to supply the control information from the reception section 14 to the encoding section 12. This enables to adjust (optimize) the video signal input to the encoding section 12 together with its encoding mode, in a manner suitable for the image recognition process.

Embodiment 5

<Image for Recognition/Marker for Recognition>

In the above-described embodiments, the encoding and decoding are performed using the input video signal as is, and the encoding mode is adjusted (optimized) using the recognition accuracy information at the time of performing the image recognition process. However, in an embodiment 5, descriptions will be made to the embodiment for adjusting (optimizing) the encoding mode, using a known image instead of the input video signal. Because the known image is used, it is possible to prepare an expected value for the result of the image recognition process. Thus, it is possible to determine an encoding mode more accurately. The technique to be explained in the embodiment 5 can be combined with not only the above-explained embodiments 1 to 4, but also various embodiments.

Figure 6:
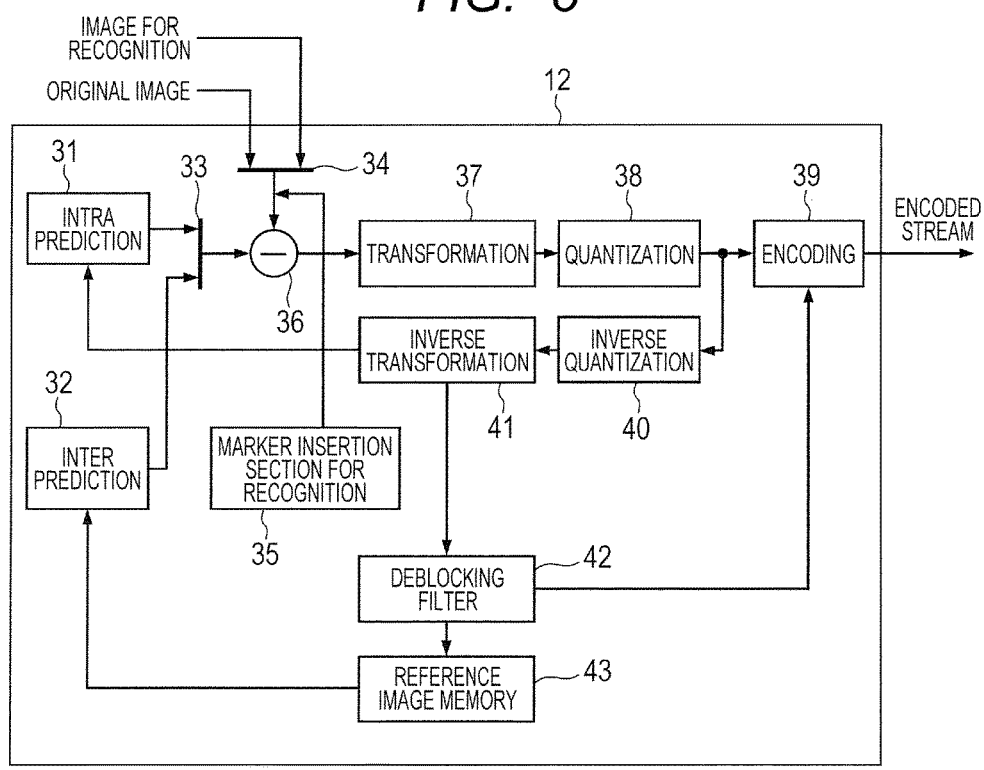
FIG. 6 is a block diagram illustrating a configuration example of an encoding section according to an embodiment 5.

FIG. 6 is a block diagram illustrating a configuration example of an encoding section 12 according to the embodiment 5. An encoding section 12 performs an encoding process for a target image for evaluation instead of an original image as a video signal to be input, or a target image wherein a marker for evaluation is inserted into the original image, to generate an encoded stream. The encoding section 12 includes selectors 33 and 34, a marker insertion section 35 for recognition, a subtracter 36, intra prediction 31, inter prediction 32, transformation 37, inverse transformation 41, quantization 38, inverse quantization 40, encoding 39, a deblocking filter 42, and a reference image memory 43. The selector 34 selects either one of the original image and the image for evaluation as a video signal to be input, and inputs it to the encoding section 12. The marker insertion section 35 for recognition can insert a marker for recognition into an input image signal. The selector 33 inputs a result of the intra prediction 31 or the inter prediction 32 to the subtracter 36, to subtract it from an image signal as a target to be encoded and input from the selector 34, and to output a differential signal from the subtracter 36. The differential signal is orthogonally transformed 37, using, for example, Discrete Cosine Transform, and quantized 38, and also encoded 39, using, for example, entropy coding. Then, the signal is output as an encoded stream. An output of the quantization 38 is output as a local decoded image, through the inverse quantization 40, the transformation 37, and the inverse transformation 41. Then, it is supplied to the intra prediction 31, and stored in the reference image memory 43 through the deblocking filter 42. The local decoded image stored in the reference image memory 43 is referred by the inter prediction 32. Parameters of the deblocking filter 42 are included in the encoded stream by the encoding section 39, and transmitted to the decoding section. FIG. 6 illustrates only the encoding section 12. However, other configurations and operations are the same as those of the image communication apparatuses 100 of the embodiments illustrated in FIGS. 1, 3, 4, and 5.

In the image communication apparatuses 100 according to the above embodiments, the encoding section 12 according to the embodiment 5 is mounted. This enables efficient calibration over the system. For example, when the algorithm of the image recognition 23 inside the reception unit 20 is optimized, it is possible to use an encoded image whose expected value is known in advance. This will be a function for supporting the measurement of a recognition rate for use in selecting the encoding mode of the encoding section 12, thus realizing more accurate feedback.

Generally, the transmission path 29 is in a limited band, and the encoding section 12 needs to perform an encoding process more appropriately in the limited band. In this case, when "encoding more appropriately" implies encoding for realizing a high image recognition rate in the reception unit 20, it is possible to efficiently adjust the parameters corresponding to a sequence level determined by the system, by using this configuration.

The parameters corresponding to the sequence level have a color format of 4:2:0/4:2:2 and/or a bit depth of 8/10/12/14 bit. For example, when it is considered that an image is encoded with a bit depth of 8 bits or a bit depth of 10 bits, an amount of information is greater in the case of the encoding with the bit depth of 10 bits than the encoding with the bit depth of 8 bits, if the same bit rate (same band) is applied. Thus, it is necessary that the quantized value be greater. In this case, the image quality may be deteriorated, depending on the conditions. It may be difficult to judge which is more advantageous, by the effect of the image recognition algorithm, in terms of the image recognition rate. By using the present configuration, it is possible to determine an appropriate encoding technique as a system including an image recognition algorithm.

Accordingly, the embodiments of the present invention by the present inventors have specifically been described. However, the present invention is not limited to these, and various changes may be possible without departing from the scope of the invention.

For example, the signal processes of the imaging signal processing section 11, the encoding section 12, the decoding section 22, and the image recognition sections 15 and 25 may be implemented using a dedicated logical circuit, or may be implemented by the software executed by a processor or the like. The transmission path 29 may be a wired network, a wireless network, or a peer-to-peer communication circuit.

What is claimed is:

1. An image communication apparatus, comprising:
    an encoding section which performs an encoding process for a video signal to be input based on a calculated encoding mode, and transmits an encoded stream;
    a decoding section which performs a decoding process for a received encoded stream, and outputs a decoded image; and
    an image recognition section which receives the decoded image sent by the decoding section and performs an image recognition process for the decoded image,
    wherein the image communication apparatus includes an image transmission apparatus and an image reception apparatus,
    wherein the image reception apparatus includes the decoding section, the image recognition section, and a parameter transmission section which transmits control information including a recognition accuracy information generated by the image recognition section to the image transmission apparatus,
    wherein the image transmission apparatus includes the encoding section, and a reception section which receives the control information, and supplies the recognition accuracy information included in the control information to the encoding section,
    wherein the encoding section selects the encoding mode based on a decoding information including a parameter of a deblocking filter, the recognition accuracy information representing a certainty of a recognition result in the image recognition section, and a recognition area information, the decoding information being transmitted from the parameter transmission section to the reception section in the image transmission apparatus as the control information,
    wherein the recognition accuracy information representing the certainty of the recognition result in the image recognition section includes information representing certainty of results of image detection, recognition, and tracking by the image recognition section, the results of the image detection, recognition, and tracking being acquired from a threshold value representing a similarity level of processes or a number of passing stages of identification circuits,
    wherein the decoding information, the recognition accuracy information, and the recognition area information are transmitted from the image recognition section to the encoding section,
    wherein the image transmission apparatus further comprises a selector, a marker insertion section for recognition, and an image for evaluation given in advance, as the video signal,
    wherein the selector selects one of an original image and the image for evaluation as the video signal to be input, and inputs the video signal to the encoding section, and
    wherein the marker insertion section inserts the image for evaluation into the video signal.

2. The image communication apparatus according to claim 1, wherein the image transmission apparatus includes the encoding section, and the reception section which receives the control information, and supplies the encoding mode included in the control information to the encoding section.

3. The image communication apparatus according to claim 2, wherein the image transmission apparatus further includes an imaging signal processing section which generates the video signal from an imaging signal to be input,
    wherein the control information includes parameters for a signal process to be executed for the imaging signal processing section to generate the video signal,
    wherein the parameters included in the control information received by the reception section are supplied to the imaging signal processing section,
    wherein the imaging signal processing section performs processes for the imaging signal to be input, and
    wherein the processes include gain adjustment, backlight correction, image level adjustment, gamma correction, color correction, and a filter process.

4. The image communication apparatus according to claim 1, wherein the image recognition section is used as a reception-side image recognition section,
    wherein the image transmission apparatus includes an imaging signal processing section which generates the video signal from an imaging signal to be input, a transmission-side image recognition section, and the encoding section,
    wherein the image reception apparatus includes the decoding section and the reception-side image recognition section,
    wherein the transmission-side image recognition section performs an image recognition process for the video signal processed by the imaging signal processing section, and supplies the encoding section with certainty of a recognition result in the transmission-side image recognition section, as recognition accuracy information representing the certainty of the recognition result in the reception-side image recognition section, and
    wherein the encoding section selects the encoding mode based on the recognition accuracy information.

5. The image communication apparatus according to claim 1,
    wherein the encoding section performs an encoding process for the video signal including the image for evaluation,
    wherein the image recognition section in the image reception apparatus performs an image recognition process for a decoded image corresponding to the image for evaluation, to obtain recognition accuracy information, and
    wherein the image transmission apparatus or the image reception apparatus selects the encoding mode in a manner that the obtained recognition accuracy information is equal to expected recognition accuracy information.

6. An image transmission apparatus, comprising:
    an encoding section which performs an encoding process for a video signal to be input based on a calculated encoding mode, and transmits an encoded stream; and
    a transmission section which transmits the encoded stream to an image reception apparatus,
    wherein the image reception apparatus includes an image recognition section performing a decoding process for a received encoded stream and further performing an image recognition process for a generated decoded image, wherein the image reception apparatus includes a decoding section, the image recognition section, and a parameter transmission section which transmits control information including a recognition accuracy information generated by the image recognition section to the image transmission apparatus, wherein the image transmission apparatus further comprises a reception section which receives the control information, and supplies the recognition accuracy information included in the control information to the encoding section, wherein the encoding section selects the encoding mode based on a decoding information including a parameter of a deblocking filter, the recognition accuracy information representing a certainty of a recognition result in the image recognition section of the image reception apparatus, and a recognition area information, the decoding information being transmitted from the parameter transmission section to the reception section in the image transmission apparatus as the control information, wherein the recognition accuracy information representing the certainty of the recognition result in the image recognition section includes information representing certainty of results of image detection, recognition, and tracking by the image recognition section, the results of the image detection, recognition, and tracking being acquired from a threshold value representing a similarity level of processes or a number of passing stages of identification circuits, wherein the decoding information, the recognition accuracy information, and the recognition area information are transmitted from the image recognition section to the encoding section, wherein the image transmission apparatus further comprises a selector, a marker insertion section for recognition, and an image for evaluation given in advance, as the video signal, wherein the selector selects one of an original image and the image for evaluation as the video signal to be input, and inputs the video signal to the encoding section, and wherein the marker insertion section inserts the image for evaluation into the video signal.

7. The image transmission apparatus according to claim 6, wherein the encoding section selects the encoding mode based on the recognition accuracy information supplied from the reception section, and executes the encoding process based on the selected encoding mode.

8. The image transmission apparatus according to claim 6, wherein the control information including the encoding mode selected based on the recognition accuracy information generated by the image recognition section is transmitted to the image transmission apparatus, and the image reception apparatus includes the reception section receiving the control information and supplying the encoding mode included in the control information to the encoding section, and wherein the encoding section executes the encoding process based on the encoding mode supplied from the reception section.

9. The image transmission apparatus according to claim 8, further comprising:

an imaging signal processing section which generates the video signal from an imaging signal to be input, and wherein the control information includes parameters for a signal process to be executed for the imaging signal processing section to generate the video signal, wherein the parameters included in the control information received by the reception section are supplied to the imaging signal processing section, wherein the imaging signal processing section performs processes for the imaging signal to be input, and wherein the processes include gain adjustment, backlight correction, image level adjustment, gamma correction, color correction, and a filter process.

10. The image transmission apparatus according to claim 6, wherein the image recognition section is used as a reception-side image recognition section, wherein the image transmission apparatus includes an imaging signal processing section generating the video signal from an imaging signal to be input, a transmission-side image recognition section, and the encoding section, wherein the transmission-side image recognition section performs an image recognition process for the video signal processed by the imaging signal processing section, and supplies the encoding section with a certainty of a recognition result in the transmission-side image recognition section as the recognition accuracy information representing a certainty of a recognition result in the reception-side image recognition section, and wherein the encoding section selects the encoding mode based on the recognition accuracy information.

11. The image transmission apparatus according to claim 7, wherein the encoding section performs an encoding process for the video signal including the image for evaluation, wherein the image recognition section in the image reception apparatus performs an image recognition process for a decoded image corresponding to the image for evaluation, to obtain recognition accuracy information, and wherein the image transmission apparatus or the image reception apparatus selects the encoding mode in a manner that the obtained recognition accuracy information is equal to expected recognition accuracy information.

12. An image reception apparatus, comprising:

a reception section which receives an encoded stream transmitted from an image transmission apparatus;

a decoding section which performs a decoding process for the encoded stream received by the reception section, and outputs a decoded image;

an image recognition section which performs an image recognition process for the decoded image; and a parameter transmission section, wherein the encoded stream is generated through an encoding process using an encoding mode for a video signal, in the image transmission apparatus, and wherein the parameter transmission section transmits control information for selecting the encoding mode in the image transmission apparatus, based on a decoding information including a parameter of a deblocking filter, a recognition accuracy information representing certainty of a recognition result in the image recognition section, and a recognition area information, wherein the image transmission apparatus includes an encoding section, and another reception section which receives the control information, and supplies the recognition accuracy information included in the control information to the encoding section, the decoding information being transmitted from the parameter transmission section to said another reception section in the image transmission apparatus as the control information, wherein the recognition accuracy information representing the certainty of the recognition result in the image recognition section includes information representing certainty of results of image detection, recognition, and tracking by the image recognition section, the results of the image detection, recognition, and tracking being acquired from a threshold value representing a similarity level of processes or a number of passing stages of identification circuits, wherein the decoding information, the recognition accuracy information, and the recognition area information are transmitted from the parameter transmission section to the image transmission apparatus, wherein the image transmission apparatus further comprises a selector, a marker insertion section for recognition, and an image for evaluation given in advance, as the video signal, wherein the selector selects one of an original image and the image for evaluation as the video signal to be input, and inputs the video signal to the encoding section, and wherein the marker insertion section inserts the image for evaluation into the video signal.

13. The image reception apparatus according to claim 12, wherein the parameter transmission section transmits the recognition accuracy information as the control information for selecting the encoding mode in the image transmission apparatus, and wherein the image transmission apparatus selects the encoding mode based on the received recognition accuracy information.

14. The image reception apparatus according to claim 12, wherein the parameter transmission section transmits the encoding mode selected based on the recognition accuracy information generated by the image recognition section to the image transmission apparatus, as the control information, and wherein the image transmission apparatus executes the encoding process using the encoding mode received as the control information.

15. The image reception apparatus according to claim 12, wherein the control information transmitted from the parameter transmission section to the image transmission apparatus includes decoded information obtained through the decoding process in the decoding section or information generated based on the decoded information.

16. The image communication apparatus according to claim 1, wherein the encoding mode comprises a prediction mode and the parameter regarding the deblocking filter.

17. The image communication apparatus according to claim 1, wherein the encoding section comprises:
an encoding process section; and
an encoding mode determining section,
wherein the encoding mode determining section refers to internal parameters of the encoding section, obtains the calculated encoding mode, and supplies the calculated encoding mode to the encoding process section,
wherein the internal parameters of the encoding section comprises:
a Sum of Absolute Difference (SAD) that is a sum of absolute values of an error between an input signal to the encoding process section and a prediction signal; and
a quantized value at a process of prediction.

18. The image communication apparatus according to claim 1, wherein the image recognition section extracts a feature amount and determines a feature point of the extracted feature amount with using a predetermined threshold value,
wherein the encoding section performs a process for switching to an encoding technique by assigning codes to a position in which the feature amount exists around the threshold value, or by increasing a number of codes to be generated, and
wherein the encoding section changes parameters including a filter strength, a block division, a quantized value, and an Intra Pulse Code Modulation (IPCM) encoding based on the recognition accuracy information to encode an area specified by the recognition area information.

19. The image communication apparatus according to claim 18, wherein the control information further includes application information of image recognition, and information regarding a traveling state of a vehicle.

20. The image communication apparatus according to claim 5, wherein the parameter transmission section further transmits application information of image recognition as the control information, and
wherein the image communication apparatus optimizes an algorithm of image recognition of the image recognition section by using the image for evaluation given in advance.

* * * * *